United States Patent [19]
Brown

[11] 3,756,617
[45] Sept. 4, 1973

[54] SAFETY APPARATUS
[75] Inventor: Darrell S. Brown, Livonia, Mich.
[73] Assignee: Eaton Corporation, Cleveland, Ohio
[22] Filed: July 21, 1971
[21] Appl. No.: 164,721

Related U.S. Application Data
[62] Division of Ser. No. 857,666, Sept. 15, 1969, Pat. No. 3,640,546.

[52] U.S. Cl. ............... 280/150 AB, 49/21, 180/90
[51] Int. Cl. ............................................. B60r 21/04
[58] Field of Search .................. 280/150 AB, 150 B; 180/90; 220/47; 206/DIG. 30; 49/9, 21, 364, 366, 367, 386; 296/37 R; 312/297

[56] References Cited
UNITED STATES PATENTS
2,571,627   10/1951   Sloman et al. .................... 180/90
3,439,769   4/1969    Brilmyer ..................... 280/150 B
2,375,567   5/1945    Luton ................................ 180/90
3,539,200   11/1970   Chute .......................... 280/150 AB
3,602,327   8/1971    Barenyi ....................... 280/150 B Primary Examiner—Leo Friaglia
Assistant Examiner—John A. Pekar
Attorney—Yount & Tarolli

[57] ABSTRACT

A safety apparatus for protecting an occupant of a vehicle during the occurrence of an accident includes an expandable confinement. The confinement has a collapsed inoperative condition and an expanded operative condition for restraining movement of the occupant during the accident. A break-away dash panel is provided for at least in part enclosing the confinement when the confinement is in its inoperative condition.

3 Claims, 7 Drawing Figures

PATENTED SEP 4 1973 3,756,617

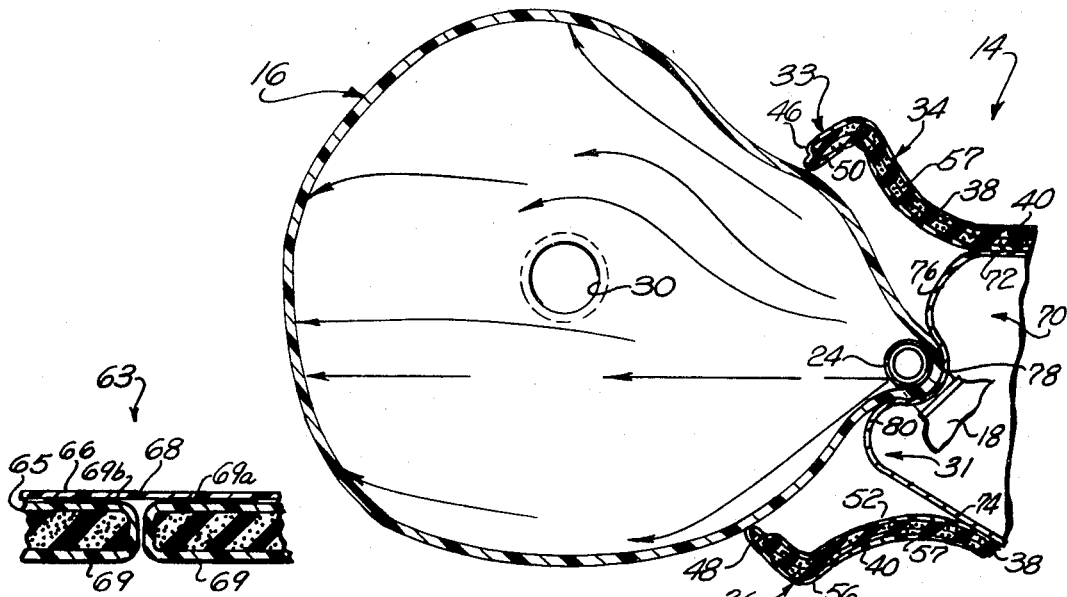

SAFETY APPARATUS

This is a division of co-pending U.S. Pat. application Ser. No. 857,666, filed Sept. 15, 1969, now U.S. Pat. No. 3,640,546.

The present invention relates to a safety apparatus for protecting an occupant of a vehicle, and more specifically relates to a safety apparatus which includes an expandable confinement having a collapsed inoperative condition and expanded operative condition for restraining movement of an occupant during an accident.

A known safety apparatus includes a confinement having a collapsed inoperative condition and an expanded operative condition for restraining movement of an occupant of the vehicle during an accident. The confinement is located on an interior portion of the vehicle and is associated with means for expanding the confinement in response to the occurrence of an accident.

Many problems are associated with mounting such a safety apparatus in a vehicle. Particularly, these problems center in the area of providing an attractive appearance for the interior of the vehicle by hiding or enclosing the safety apparatus from view without unduly restricting expansion thereof. The present invention is directed to a panel and pad construction which is constructed so as to hide the safety apparatus from view without detracting from the appearance of the interior portion of the vehicle. At the same time, the pad is of a break-away construction so that expansion of the confinement is not unduly hampered by the pad construction.

The pad is constructed with a resilient core of foam rubber or other suitable material and a covering therefor. This protects the occupant in the event of impact thereagainst under low velocity conditions. Furthermore, the construction of the break-away pad is such that upon expansion of the confinement the confinement will not engage any of the resilient core material in the pad. It has been discovered that engagement of the confinement with the resilient core and the movement of the confinement relative to the core result in the material thereof being sheared therefrom. This material may be directed toward the occupant and may cause injury to the occupant.

Accordingly, it is an object of the present invention to provide a new and improved break-away pad construction for enclosing a safety apparatus, which inlcudes an expandable confinement; and wherein the break-away pad is constructed so as not to unduly restrict expansion of the confinement.

A further object of the present invention is the provision of a new and improved break-away pad construction for enclosing a safety apparatus which includes an expandable confinement and wherein the break-away pad construction includes a resilient core material surrounded by a covering, and wherein the covering prevents engagement of the confinement with the resilient core material upon expansion of the confinement to thereby prevent core material from being sheared due to expansion of the confinement.

A still further object of the present invention is the provision of a new and improved resilient pad construction for hiding a safety apparatus from view and which pad construction is formed of a plurality of sections which have an interlocking relationship when the safety apparatus is in its inoperative condition and which separate to allow the safety apparatus to move to its operative condition.

Still another object of the present invention is the provision of a new and improved safety apparatus located in the dashboard of a vehicle and including an expandable confinement having a collapsed inoperative condition and an expanded operative condition, means for at least in part enclosing the confinement, the means including a plurality of sections, each of which include a core of resilient material and a protective casing, and wherein the sections are interconnected in an adjacent relationship when the confinement is in its inoperative condition and are separable upon expansion of the confinement.

Further objects and advantages of the present invention will become apparent from the following detailed description of the present invention made with reference to the accompanying drawing forming a part of this specification and in which.

Figure 1:
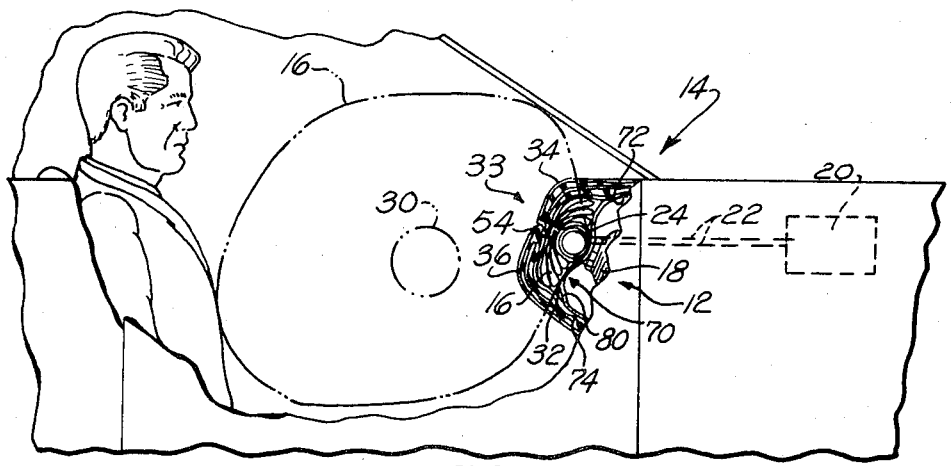
FIG. 1 illustrates a schematic view of a vehicle incorporating the present invention in the dashboard thereof.
Figure 2:
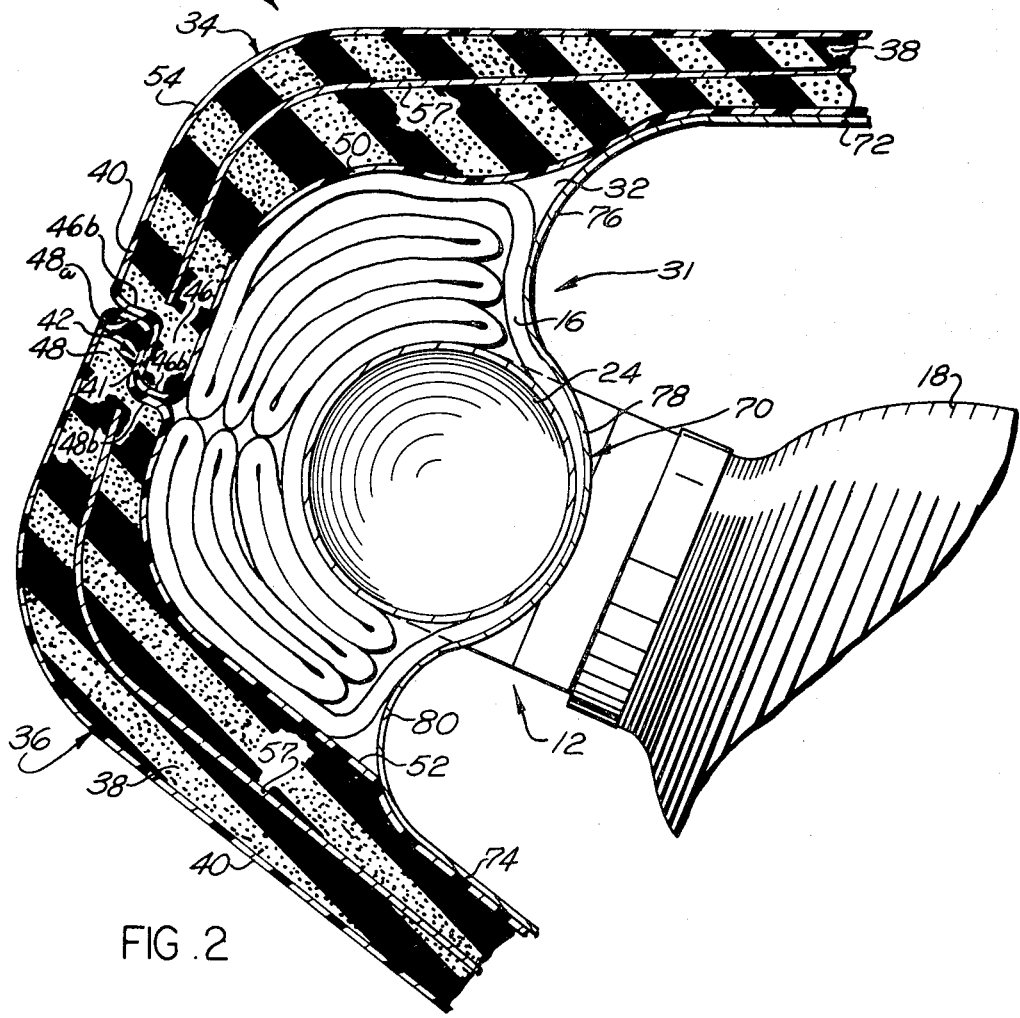
FIG. 2 illustrates the embodiment of the present invention shown in FIG. 1 on an enlarged scale.

FIG. 3 further illustrates the embodiment of the present invention illustrated in FIG. 2 with the safety apparatus disposed in its operative condition;

FIG. 4 illustrates a portion of the embodiment shown in FIG. 1;

FIG. 5 illustrates a modification of the embodiment of the invention illustrated in FIG. 1;

FIG. 6 illustrates a further embodiment of the present invention; and

FIG. 7 illustrates another modification of the embodiment of the invention illustrated in FIG. 1.

The present invention relates generally to a vehicle safety apparatus and, more particularly, to a vehicle safety apparatus having an expandable confinement disposed in a protective enclosure defined in part by the dashboard of the vehicle. The confinement has a collapsed inoperative condition and an expanded operative condition for restraining movement of an occupant of a vehicle during an accident. The enclosure is provided by a break-away pad construction forming a part of the dashboard of the vehicle.

As illustrated in FIG. 1, a safety apparatus, generally designated 12, is located in the dashboard 14 of a vehicle. The safety apparatus 12 includes an expandable confinement 16, illustrated in full lines in FIG. 1, in its collapsed or inoperative condition and in dotted lines in its expanded or operative condition. The safety apparatus 12 includes a source of fluid 18, such as a high pressure fluid reservoir or a suitable gas generator. In one specific preferred embodiment, this source 18 is a fluid reservoir which is remotely located with suitable fluid conduits or ducting for conducting the fluid. In the illustrated embodiment, a fluid reservoir is used as a source of fluid. A sensor 20 is disposed on the vehicle and is operable to sense the occurrence of an accident. Upon the occurrence of an accident, the sensor 20 directs a signal through the wires 22 to effect opening of the fluid reservoir 18. Preferably, an explosive charge is disposed in a plug or valve (not shown) for blocking fluid flow from the reservoir 18 and is operable to rupture the plug upon receiving a signal through the wires 22 from the collision sensor 20. When the explosive charge is activated, an opening is effected in the reservoir 18 and the fluid flows from the fluid reservoir 18 through a duct 23 to a diffuser member 24. The construction of the plug, reservoir, and diffuser are shown in Goetz et al. U.S. Pat. application Ser. No. 730,024, filed Jan. 9, 1969, and assigned to the assignee of the present application. The diffuser member 24 has a plurality of openings therein and is operable to effect fluid flow in a predetermined manner to the interior of the confinement 16. The flow of the fluid to the interior of the confinement 16 effects expansion of the confinement. The confinement is then disposed in its dotted-line position and is operable to restrain movement of the occupant of the vehicle in a known manner.

A blowout patch 30 may be disposed on the confinement 16 in order to prevent rebound of the occupant from the confinement when the occupant impacts therewith. The blowout patch 30 will be operable to form an opening to release fluid pressure from the confinement when the occupant impacts therewith.

As illustrated in FIG. 2, the confinement is normally stored in a collapsed inoperative condition. When in this stored position, the confinement is located within a chamber or enclosure 32 defined in part by the dashboard 14. The dash-board 14 is formed by the support panel 31 and a break-away pad construction 33. The pad construction 33 includes a pair of padded or cushion sections 34, 36. The sections 34, 36 each include a core of highly resilient material 38. It is contemplated that the resilient material 38 could be formed by many different types of cushioning materials including known foam materials. The core 38 is enclosed by a protective casing 40 formed of a suitable plastic material. The sections 34, 36 have a suitable inter-connection therebetween, such as a joint 42.

The sections 34, 36 cooperate with the support panel 31 to form a protective enclosure for the confinement 16 when the confinement is disposed in its collapsed inoperative condition illustrated in FIG. 2. The sections 34, 36 protect the confinement from contact with persons or things in the vehicle and thus protect the confinement from damage. It should be realized that in order for the safety apparatus 12 to be operable to protect an occupant of the vehicle during the occurrence of an accident, the confinement 16 must be preserved in an operative condition. If the occupant damages the confinement 16, or if vandals or inquisitive children damage the confinement 16, then the confinement may be inoperative upon the occurrence of an accident.

Moreover, it should be noted that the sections 34, 36 are also operable to prevent injury to the occupant of the vehicle should the occupant impact with the dashboard 14 of the vehicle when the confinement 16 is in its inoperative condition. Such impact by the occupant may occur during braking or minor accidents wherein it is not desired to activate the safety apparatus 12. Thus, it can be readily seen that the sections 34, 36 protect the confinement 16 from damage and also tends to protect the occupant from injury by preventing the occupant from impacting directly with the safety apparatus 12.

While the sections 34, 36 in part define the enclosure 32 in the dashboard 14 for the confinement 16, the sections 34, 36 also form an integral part of the interior of the vehicle. Therefore, they are designed not only to have a functional value, but also an aesthetic value. The design of the sections 34, 36 is such that the safety apparatus 12 is hidden from the view of the occupants in a manner which does not detract from the appearance of the vehicle.

As noted above, the sections 34, 36 have a suitable interconnection or joint, generally designated 42. The joint 42 includes overlapping portions 46, 48 of the sections 34, 36, respectively. The protective casing 40 for the sections 34, 36 is shown in FIG. 4 prior to molding of the sections. The casing 40 has a seal area 41 which separates the casing into two parts which serve as the casing for the sections 34, 36, respectively. The seal area 41 may be formed in any suitable manner. However, heat sealing is the desirable method of forming the area 41. After the seal area 41 is formed, the resilient material 38 is molded in each casing section to form the sections 34, 36 with the overlapping portions 46, 48. When so formed, the seal area 41 is positioned at the joint or interconnection 42 intermediate sections 34, 36 as illustrated in FIG. 2.

During braking or minor accidents, it is contemplated that the dashboard 14 will be subjected primarily to inwardly or forwardly directed forces having an upward component. Accordingly, the portion 48 is disposed outwardly of and overlaps the section 46 in such a manner that these inward and upwardly directed forces place the joint 42 in compression in such a manner as to tend to minimize rupturing forces on the seal area 41. Thus, the outer end section 48a of the end portion 48 is received in a recess 46b of the end portion 46 while inner end section 46a is received in a recess 48b. This results in the joint 42 being placed in compression by inward and upward directed forces in an arch-like or interlocking manner so that forces are transmitted by abutting engagement of the overlapping portions 46, 48. This tends to minimize the stresses applied to seal area 41 so that the seal area remains intact. Moreover, the overlapping portions 46, 48 minimize the possibility of the seal area 41 being broken and the confinement 16 tampered with by vandals or inquisitive occupants of the vehicle.

The cushion sections 34, 36 include interior surfaces 50, 52, and exterior surfaces 54, 56. The interior surfaces face the confinement 16 when confinement is in its collapsed condition as illustrated in FIG. 2. Upon expansion of the confinement 16, the confinement exerts an outwardly directed force upon the interior surface 50, 52 of the sections 34, 36, respectively (FIG. 3). This outward force tends to separate the cushion sections 34, 36 and places the seal area 41 in tension and shear. The construction of the joint 42 is such that these outwardly directed tension and shear forces are transmitted directly to the seal area 41 and are not absorbed by the overlapping end portions 46 and 48. The shear forces on the joint 42 result from relative movement between the cushion sections 34 and 36. Therefore, the tension and shear forces resulting from initial expansion of the confinement 16 easily break or rupture the seal area 41. The cushion sections 34 and 36 are then free to move to the open position of FIG. 3 under the influence of the expanding confinement 16.

Separation of the cushion sections 34, 36 is accomplished without rupturing the protective casing 40 in which the resilient material 38 is located (see FIG. 3). This allows expansion of the confinement 16 without exposing the resilient material 38 to the expanding confinement. If the casing is ruptured and the resilient material is engaged by the expanding confinement, pieces of the resilient material have a tendency to be sheared and scattered throughout the interior of the vehicle. This sheared material may result in injury to the occupant. To make sure that the seal area 41 ruptures without rupturing the casing, the material thickness 41a is greater than the web thickness 41b and the thickness 40a of the casing 40. Although the web thickness 41b could be approximately equal to the thickness 40a of the casing 40, in a specific preferred embodiment of the invention the web thickness 41b is less than the material thickness 40a to insure that the seal area 41 will rupture with the casing 40 intact. Since the seal area 41 breaks and the protective casing 40 around the resilient material 38 remains intact, the resilient material 38 is not contacted by the confinement 16 when it is expanded. Thus, scattering of the resilient material is prevented and the chance of injury to the occupant of the vehicle is further minimized.

Upon the occurrence of an accident, fluid flows from the reservoir 18, through the diffuser 24, to the interior of the confinement 16. The flow of fluid to the interior of the confinement 16 initiates expansion of the confinement 16. Initial expansion of the confinement results in directed forces being applied to the inner surfaces 50, 52 of the sections 34, 36, respectively. These outward forces place the joint 42 in tension. The joint 42 is so constructed that the shear and tension forces are resisted only by the seal area 41. Therefore the seal area 41 is readily ruptured by forces resulting from initial expansion of the confinement 16. Since the seal area 41 is weaker than the casing 40, the seal area ruptures with the casing intact. Rupture of the seal area 41 enables the sections 34, 36 to separate and swing outwardly in response to the force exerted on the inner surfaces 50, 52 by continued expansion of the confinement 16, and allows the confinement to expand through the separated sections to restrain movement of an occupant of the vehicle.

A reinforcing section 57 is advantageously provided to insure that the cushion sections 34 and 36 do not break their connections to the vehicle. In addition, the reinforcing section increases the strength of the cushion sections 34 and 36 so that they can withstand inflation forces when the casing 40 is weakened by exposure to either relatively low temperatures which tend to make the casing brittle or relatively high temperatures which tend to increase the plasticity of the casing. While the reinforcing section 57 is illustrated as being placed between the inner and outer layers of the casing 40 when the casing is foamed, it is contemplated that the reinforcing section could be used as the inner layer of the casing 40. The reinforcing section 57 can be made from any suitable material such as a thin flexible sheet of steel, metallic screen, or a strong fabric.

Another embodiment of the present invention is illustrated in FIG. 5. The embodiment, as illustrated in FIG. 5 has a seal area 41 similar to the seal area 41 of the embodiment illustrated in FIG. 4. Here the seal area 41 of the casing 40 that extends between the sections 34, 36 has a plurality of holes 58a punched therein which tend to further weaken the seal area 41 of the casing 40. Obviously, the further weakening of the area 41 allows easier expansion of the confinement 16 from its collapsed inoperative condition to an expanded operative condition and provides a better control of the location of the separation of the panel sections 34, 36.

Still another embodiment of the present invention is illustrated in FIG. 6. FIG. 6 illustrates the sections 34, 36 as being interconnected by overlapping or interlocking sections 60, 62 of the sections 34, 36, respectively. The interlocking sections 60, 62 are operable to hold the sections 34, 36 in an adjacent relationship when the safety apparatus is in its inoperative condition. The portions 60, 62 of the sections 34, 36 include a portion of the protective casing 40 which has the resilient material 38 disposed therein. However, a separate ball and socket strip could be secured to sections 34, 36. This enables the portions 60, 62 to be resilient or flexible so that interlocking is readily accomplished therebetween. In other words, the sections 34, 36 are held together solely by the interlocking of the portions 60, 62. Upon expansion of the confinement 16, the interlocking portions 60, 62 will be bent apart and will allow the portions 34, 36 to separate under the force of an expanding confinement. The separated sections will create an opening therebetween to allow the confinement 16 to expand and restrain movement of the occupant. Moreover, the separation of the sections 34, 36 is accomplished without rupturing the casing 40 and exposing the resilient material to the expanding confinement 16. Thus, scattering of the resilient material throughout the interior of the vehicle is prevented.

The embodiment of the invention illustrated in FIG. 7 is the same as the embodiment illustrated in FIG. 2 with the exception of the construction of the cushion sections and the joint therebetween. The embodiment of FIG. 7 includes a pair of relatively movable sections 63 and 64 having a core 65 covered by a protective casing 66. The protective casing 66 includes an outer layer or skin 67 formed of a plastic or vinyl material. The outer layer 67 extends between adjacent end portions of the sections 63 and 64 to provide a joint 68 interconnecting the sections. The outer layer 67 extends along or generally tangentially to the adjacent end portions of the sections 63 and 64 so that the outer layer or portion 67 of the protective casing 66 has a generally continuous cross-sectional configuration at the joint 68 to provide a pleasing aesthetic effect. In the illustrated embodiment of the invention, a joint is provided by preweakening the outer layer 67, by reducing its thickness along a line 68. Any means of preweakening may be utilized, such as radio frequency heating while loading, perforating, etc., providing that the section strength is sufficiently weakened to ensure that the outer layer 67 will rupture along the line 68 upon initial expansion of the confinement. An inner layer 69, of relatively strong material such as nylon, is bonded to the outer layer 67 at a convenient point, such as at 69a, 69b, or may extend to entirely surround the core 65 and be fastened at its outer edge.

Upon initial expansion of the confinement associated with the embodiment of FIG. 7, relatively large tensile forces are created at the joint 68 due to moments resulting from the force applied to the sections 63 and 64 by the confinement. However, when an inwardly directed force is applied to a dashboard constructed in accordance with the embodiment of FIG. 7, there are no moments established at the joint 68 due to its location on the outermost portion of the dashboard. In addition to the specific preferred construction illustrated in FIG. 7, it should be understood that the resilient core 65 could be completely enclosed in a layer of nylon material and be disposed in abutting engagement with an outer layer of vinyl or plastic material which forms an outer surface of the dashboard.

In accordance with another feature of the present invention, the support panel 31 includes a contoured main section 70 (see FIGS. 1 and 3) which is mounted on a frame of the vehicle by forwardly or inwardly projecting sections 72 and 74. If the occupant of the vehicle should impact in a generally forwardly and downwardly direction against the dashboard 14 during braking or a minor accident, the sections 72 and 74 may be deflected downwardly without deformation of the main section 70 thus increasing the effective stopping distance of the occupant, thereby cushioning occupant impact. It should be noted that during this downward deflection of the sections 72 and 74, the occupant is protected against impacting directly against the safety apparatus 12 by the cushion sections 34 and 36.

The contoured main section 70 of the support panel 31 includes a continuously curving, outwardly projecting upper portion 76 which is connected to the section 72 and to a continuously curving, intermediate portion 78 which projects inwardly. The inwardly projecting intermediate portion 78 is connected with a continuously curving lower outwardly projecting portion 80. When the support panel 31 is subjected to a relatively severe impact, the initial forces resulting from the impact deflect the sections 72 and 74 downwardly while the main section 70 maintains the contoured configuration illustrated in FIGS. 2 and 3. The continued application of the force against the support panel 31 deforms the curved portions 76, 78, 80, and diffuser member 24 to thereby absorb the higher kinetic energy of the relatively severe impact. This deformation of the curved sections 76, 78 and 80 of the support panel 31 results in the radius of curvature of the sections being decreased, that is the curved sections are partially collapsed under the influence of the relatively severe impact as well as localized deformation of the structure.

The diffuser 24 and confinement 16 are operatively connected to the inwardly curving, intermediate portion 78 of the support panel 31. The intermediate portion 78 defines a recess between the outwardly curving portions 76 and 80 for receiving the diffuser 24 and minimizing the extent to which the diffuser projects outwardly from the support panel. Upon expansion of the confinement 16, the flow of high pressure fluid from the reservoir 18 through the diffuser 24 and into the confinement 16 results in the intermediate portion 78 being deflected inwardly by reaction forces resulting from the flow of high pressure fluid. When the confinement 16 reaches its fully extended condition, the intermediate section 78 is flexed outwardly, toward the position illustrated in FIG. 3, by forces resulting from a "snapping" or rapid arrest of the deploying confinement 16. These displacements serve to cushion force applied to the confinement thus assuring its integrity for the pressure it must withstand to arrest occupant motion.

From the foregoing, it can be seen that the support panel 31 includes sections 72 and 74 which enable the support panel to be resiliently deflected thus cushioning loadings received due to impact of an occupant against the dashboard 14 during minor accidents and braking. If the impact is sufficiently severe, the contoured main portion 70 of the support panel is deformed by a decreasing of the radius of curvature of the sections 76, 78 and 80 of the support panel and through localized deformation of the structure.

Upon the occurrence of a major or relatively severe accident, fluid under pressure flows from the reservoir 18 through the diffuser 24 into the confinement 16 to activate the safety apparatus 12. This initial flow of fluid provides a reaction force which deflects the intermediate portion 78 of the support panel 31 inwardly with a resulting derease in the radius of curvature of the portions 76, 78 and 80. In addition to deflecting the intermediate portion 78 of the panel inwardly, the initial expansion of the confinement 16 bursts or ruptures the relatively weak seal area 41 and separates cushion sections 34 and 36. The confinement 16 continues to expand outwardly at a relatively high speed until it reaches its fully extended or expanded condition. The outward expansion of the confinement 16 is then arrested and results in outwardly directed forces being applied against the intermediate portions 78 of the support panel 31. These forces tend to deflect or flex the entire contoured main section 70 outwardly to absorb the forces. The contoured configuration of the support panel 31 enables the entire main portion 70 of the relatively thin support panel to deflect under the influence of both the forwardly or inwardly directed reaction forces resulting from a flow of fluid during initial expansion of the confinement and the rearwardly or outwardly directed forces resulting from the arresting of outward expansion of the confinement 16. It should be noted that the sections 72 and 74 function to cushion loadings received due to minor impacts during which it is not necessary to activate the safety apparatus 12 to adequately protect an occupant of a vehicle.

It should be realized from the above description that a new and improved dashboard includes an improved cushion assembly for at least in part enclosing a safety apparatus on a vehicle has been provided. The cushion assembly is operable to protect the occupant from injury during impact with the dashboard of the vehicle when the safety apparatus is in an inoperative condition. It should be further realized that the cushion assembly includes a plurality of sections, each of which includes a core of resilient foam material and a protective casing for the core. An interconnection is provided to hold the sections in an adjacent relationship when the safety apparatus is in its inoperative condition. The interconnection is operable to enable the sections to separate upon expansion of the confinement. Upon the occurrence of an accident, the confinement 16 is expanded and the sections are separated by the force of the expanding confinement. The sections of the dashboard that are separated are integral units and the casing that is disposed around the core of resilient material in each of the units does not rupture upon separation of the sections. The casing operates to confine the resilient material when the sections are separated and prevents the confinement from engaging with the resilient material when it is expanded. Thus, the occupant of the vehicle is protected from injury that may result if the resilient material is scattered about the interior of the vehicle.

Having described my invention, I claim:

1. Apparatus comprising resilient structure for at least in part enclosing a safety apparatus on a vehicle, said structure being resiliently operable to protect the occupant from injury during impact thereagainst, said structure comprising a plurality of individual panel sections of resilient material which come together to form a closure and which are separable upon activation of the safety apparatus to an operative position, each of said panel sections including a core of resilient material for absorbing kinetic energy of the occupant in the event the occupant impacts against the panel sections and a protective casing surrounding said core, and said casing being operable to prevent exposure of said resilient material to the interior of the vehicle when the safety apparatus is in an operative condition.

2. Apparatus as defined in claim 1 wherein said panel sections are interconnected by interlocking portions of said sections.

3. Apparatus comprising structure for at least in part enclosing a safety apparatus on a vehicle, said structure being operable to protect the occupant from injury during impact thereagainst, said structure comprising a plurality of panel sections which are separable upon activation of the safety apparatus to an operative position, each of said panel sections including a core of resilient material for absorbing kinetic energy of the occupant in the event the occupant impacts against the panel sections and a protective casing for said core, and said casing being operable to prevent exposure of said resilient material to the interior of the vehicle when the safety apparatus is in the operative condition, and said panel sections are interconnected by a portion of said protective casing of said sections that extends therebetween.

* * * * *

PO-1050
(5/69)

UNITED STATES PATENT OFFICE
CERTIFICATE OF CORRECTION

Patent No. 3,756,617    Dated  9/4/73

Inventor(s) DARRELL S. BRAWN

It is certified that error appears in the above-identified patent and that said Letters Patent are hereby corrected as shown below:

The inventor's name, as printed on the issued patent, is incorrect and should be "BRAWN" *not* Brown.

Signed and sealed this 18th day of December 1973.

(SEAL)
Attest:

EDWARD M. FLETCHER, JR.
Attesting Officer

RENE D. TEGTMEYER
Acting Commissioner of Patents